Sept. 5, 1950 C. BOYLE 2,521,035
MILLING CUTTER
Filed June 23, 1945
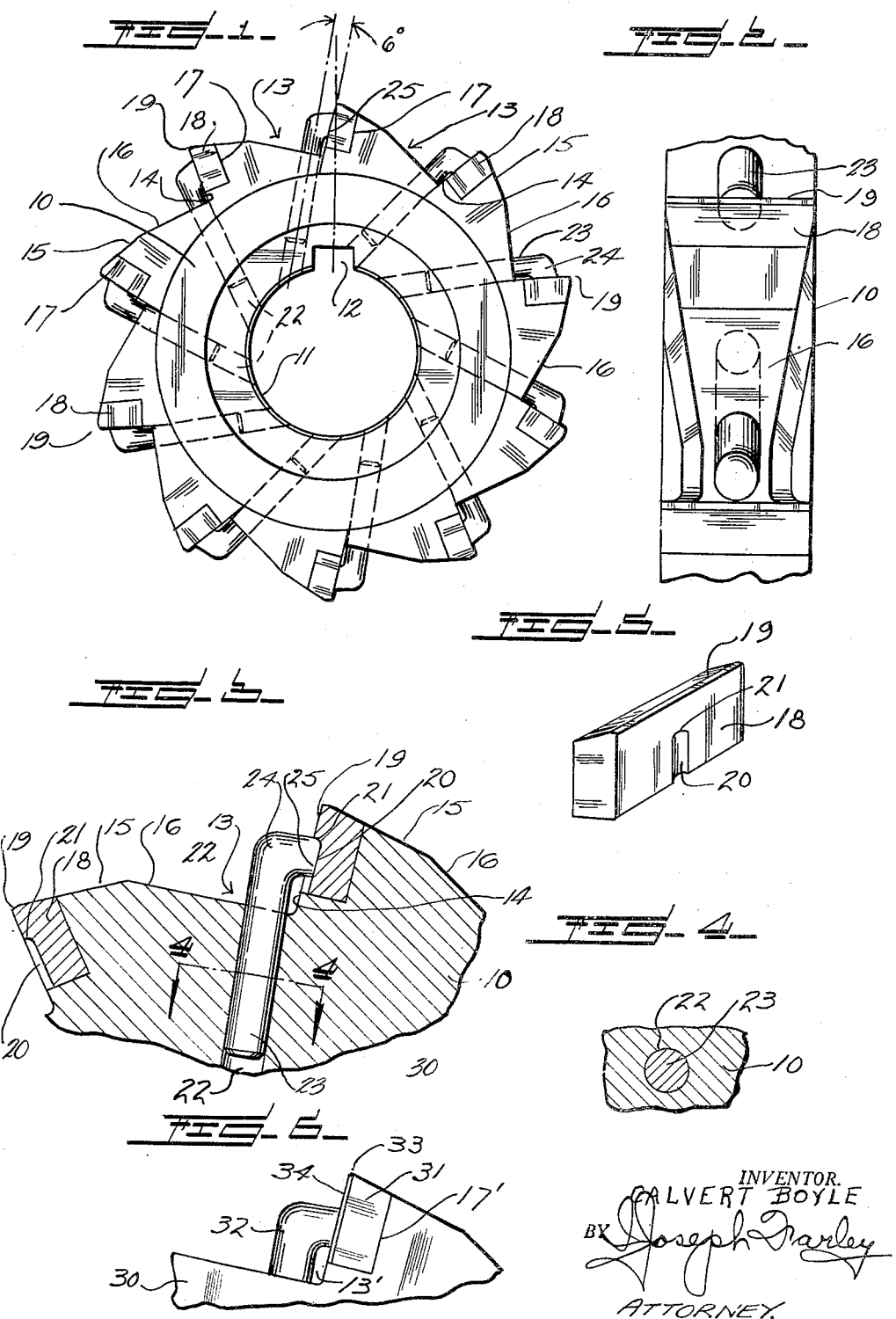
INVENTOR.
CALVERT BOYLE
BY Joseph Darley
ATTORNEY.

Patented Sept. 5, 1950

2,521,035

UNITED STATES PATENT OFFICE 2,521,035

MILLING CUTTER

Calvert Boyle, Royal Oak, Mich., assignor to American Cutter & Engineering Corporation, Warren, Mich., a corporation of Michigan Application June 23, 1945, Serial No. 601,270

3 Claims. (Cl. 29—105)

The present invention pertains to a novel wedging means for a cutting insert in a tool.

The principal object of the invention is to furnish the tool with inserts having cutting edges that are considerably harder than the body of the tool and to wedge the inserts in position by simple and effective means. Although it is common practice at the present time to provide stationary cutters with so-called carbide tips consisting principally of tungsten carbide, an improved structure is employed in the present invention and, further, with structural modifications that make possible its use in connection with milling cutters, reamers, taps or the like.

According to the invention as applied to a milling cutter, for example, each of the teeth is formed in its forward face with a notch or seat in which is mounted a hard cutting tip of tungsten carbide or comparable material. The tip is securely seated in its notch by means of a wedging device.

Various styles of wedges for holding inserted parts in cutting tools are well known in the art. The wedging face of the wedging device must be accurately machined for proper engagement with the inserted parts. I have found that a wedging device of comparatively large size is desirable for each manipulation, large bearing surface of the body of the tool and adequate strength. On the other hand, a wedging device of such size requires that a comparatively large area thereof be accurately machined. Another object of the invention is to provide a wedging device having the aforementioned desirable qualities yet requiring the machining of only a comparatively small area of its surface.

These objects are accomplished by providing the wedging device in the form of a pin having at one end a head extending laterally in one direction or toward the inserted part. Only the free extremity of the head is machined for engagement with the inserted part. Thus, the advantages of a large wedging member are retained without the usual accompanying disadvantage of machining a large portion thereof.

The angle of the wedge surface to the axis of the pin has been found to be most desirable at about 6°, from the standpoint of effectiveness and simplicity of mechanical design. Within the scope of the invention, a wedging angle between 3° and 10° affords the contemplated advantages.

The above and other objects of the invention will appear more fully from the following more detailed description and by reference to the accompanying drawing forming a part thereof and wherein:

Fig. 1 is a side elevation of a milling cutter according to the invention;

Fig. 2 is an end view thereof;

Fig. 3 is a detail cross-section;

Fig. 4 is a section on the line 4—4 of Fig. 3;

Fig. 5 is a perspective of one of the inserts, and

Fig. 6 is a detail section of a modification.

Reference to these views will now be made by use of like characters which are employed to designate corresponding parts throughout.

As shown in Figs. 1 and 2, the cutter is formed from a metal disk 10 of selected diameter and thickness. In the center of the disk is formed a hole 11 to receive a shaft, and a keyway 12 communicates with the hole. In the circumference of the disk is formed a peripheral series of substantially V-shaped notches 13, each of which has a straight forward face 14 which is slightly angular to a radius drawn through the center thereof. The remaining side of the V-notch consists of two sides 15 and 16 disposed at a wide angle to each other, the side 16 forming substantially a right angle with the side 14. The side 14 is again formed with a right angular notch or pocket 17 extending transversely of the disk and to the periphery thereof.

As already indicated, the sides 14 face forwardly or in the direction of rotation of the tool. Each side 15 extends forwardly to the next adjacent notch 17. The sides 14 if uninterrupted would intersect with the periphery of the disk to form integral saw teeth.

It is desired, however, to form the cutting edges from a material having a considerably greater hardness than the body of the disk 10. In other tools such as stationary cutters against which the work rotates, the tip consists of an alloy such as tungsten carbide. A similar practice is adopted in this invention by the provision of carbide inserts or tips to provide the cutting edges. Accordingly, a block or tip 18 of such an alloy is seated in each of the right angular notches 17.

Each block 18 has formed at its forward and upper corner a small substantially flat land 19 extending transversely of the disk 10 and the forward edge of which constitutes the actual cutting edge; similar lands 19—a are provided on the side faces. In the forward face thereof, beneath the edge of the land 19 and preferably centrally of each block, is formed a relatively narrow pocket 20 which provides an upper shoulder 21. The bottom of the recess is substantially parallel to the corresponding face 14 and slightly angular to a radius drawn through the center thereof.

A hole 22 extends inwardly from each surface 16, closely adjacent to the face 14, and preferably to the central hole 11. In each hole 22 is inserted a pin 23 having an angularly disposed head 24 directed toward the nearer block member 18. The free extremity 25 of the head is plane and parallel to the bottom of the adjacent recess 20 of its block 18 when the pin is inserted. The length of the head 24 is such that the extremity 25 is in surface contact with the bottom of the recess 20. The latter receives the head rather snugly to prevent lateral slipping of the insert 18 when wedged.

The surface 25 and the axis of the pin 23 converge inwardly of the disk at an angle of 3° to 10°, preferably about 6°, so that the head 24 constitutes a wedge against the bottom of the recess 20 when the pin is driven into the disk. In this manner the insert 18 is tightened in its seat 17. Due to the shoulder 21 which the head 24 cannot pass on entry, the tip 18 and the pin 23 are inserted together in loose contact with each other. The tip 18 is then fully seated and is finally locked by driving the pin 23. In addition to the wedging action, due to the inclination of the blocks to a radial plane of the cutter, the blocks are so located relatively to the axis of rotation that their front faces form a negative rake angle to the work which is most effective for carbide tungsten cutting blades or inserts.

The modified construction shown in Fig. 6 comprises a cutter body 30 provided with notches 13' and 17' corresponding to the notches 13 and 17 respectively of Fig. 1. A tip 31 is seated in each notch 17' and differs from the tip 18 of Fig. 1 in having no pocket in its forward face. Wedge pins 32 of the construction previously described, and in the same relative position, engage the flat forward faces of the inserts for securing the inserts in the cutter body. Each insert 31 is preferably formed with an end land 33 and side lands 34.

The angular wedge pins are of a substantial size so that they are easily handled and inserted. The shank of each pin provides a substantially large backing surface within the body of the disk with the result that the unit load on each member is not excessive. Notwithstanding the large size of each pin 23, the accurately finished wedge surface 25 thereof is relatively small in relation to the size of the pin yet sufficiently large for its intended purpose. Thus it will be seen that the pin with the angularly disposed head affords the advantages of a large member, as set forth, without requiring that a large area thereof be accurately machined.

The invention, although described in connection with a milling cutter, is not limited thereto and is applicable to various cutting tools within the scope of the appended claims. In the use of a milling cutter for facing, the non-cutting ends of the inserts are preferably backed by a washer locked on the spindle, as well known in the art.

While I have shown satisfactory constructional examples of the present invention, it will be understood that many changes, variations and modifications of the specific constructional details may be resorted to without departing from the spirit of the appended claims.

I claim:

1. In a cutting tool, a body having a notch formed therein, said notch having a forwardly facing side and a seat formed in said side, a cutting tip inserted in said seat, and a pin inserted in said body adjacent to said seat, a laterally extending head on said pin and directed toward the adjacent cutting tip, the forward face of said tip having a relatively narrow recess, a laterally extending head on said pin and received in said recess with a snug lateral fit, the free end of said head having a wedge relation to said tip, said pin being drivable into holding position and held solely by side pressure and friction resulting from said wedge relation.

2. In a rotary cutter, a disk having a peripheral series of transverse notches, each notch having a forwardly facing side and a seat formed in said side, a cutting tip inserted in each seat, and pins inserted in said disk forwardly adjacent to each of said seats and extending from said notches inwardly of said disk, a laterally extending head on each pin and directed rearwardly toward the adjacent cutting tip, the free end of each head having a wedge relation to the last named tip.

3. In a rotary cutter, a disk having a peripheral series of transverse notches, each notch having a forwardly facing side and a seat formed in said side, a cutting tip inserted in each seat, pins inserted in said disk forwardly adjacent to each of said seats and extending from said notches inwardly of said disk, a laterally extending head on each pin and directed rearwardly toward the adjacent cutting tip, the free end of each head being plane.

CALVERT BOYLE.

REFERENCES CITED

The following references are of record in the file of this patent:

UNITED STATES PATENTS

| Number | Name | Date |
|---|---|---|
| 766,144 | Gilcrest | July 26, 1904 |
| 901,681 | Collet | Oct. 20, 1908 |
| 1,487,259 | Moglich | Mar. 18, 1924 |
| 1,529,917 | Redinger | Mar. 17, 1925 |
| 1,849,160 | Walker | May 15, 1932 |
| 2,203,104 | Reaney | June 4, 1940 |
| 2,407,501 | Kraus | Sept. 10, 1946 |